Dec. 28, 1965 A. J. MAJKA 3,225,983
COMBINATION FISHING CREEL AND PORTABLE COOLER
Filed May 6, 1964

INVENTOR.
ANDREW J. MAJKA

By  *Hill, Sherman, Meroni, Gross & Simpson*
ATTORNEYS

United States Patent Office
3,225,983
Patented Dec. 28, 1965

3,225,983
COMBINATION FISHING CREEL AND
PORTABLE COOLER
Andrew J. Majka, 717 N. Willard Court, Chicago, Ill.
Filed May 6, 1964, Ser. No. 365,464
5 Claims. (Cl. 224—5)

This invention relates to improvements in combined fish creels and coolers and more particularly relates to a simplified form of creel and cooler preserving fish in a cold condition.

A principal object of the invention is to provide a lightweight, durable and sanitary creel for fish which may refiregerate and preserve the fish in a cool condition.

A further object of the invention is to provide an improved form of insulated creel for fish and the like which serves as a container for ice and retains the ice in an essentially solid condition over long periods of time, to keep fish placed in the creel in a cool condition.

Another object of the invention is to improve upon the fishing creels heretofore in use by constructing the creel of a foam or expanded plastic material providing an insulated container for fish and the like, and by covering the creel with fabric, serving as attachment means for the carrying straps of the creel and enabling the creel to readily be supported and carried on the body of the user.

A still further object of the invention is to provide an improved form of fishing creel made of a foam or expanded plastic material covered by a fabric, and having a hinged top and a removable transparent cover for the top for the insertion of fish or ice in the creel, and serving as a window to accommodate inspection of the interior of the creel without removing the top cover therefor.

Still another object of the invention is to provide a canvas covered polyethylene foam container which may contain ice and serve as a cooler as well as a sanitary carrier for fish.

These and other objects of the invention will appear from time to time as the following specification proceeds and with reference to the accompanying drawing wherein.

Figures 1, 2, 3, 4:
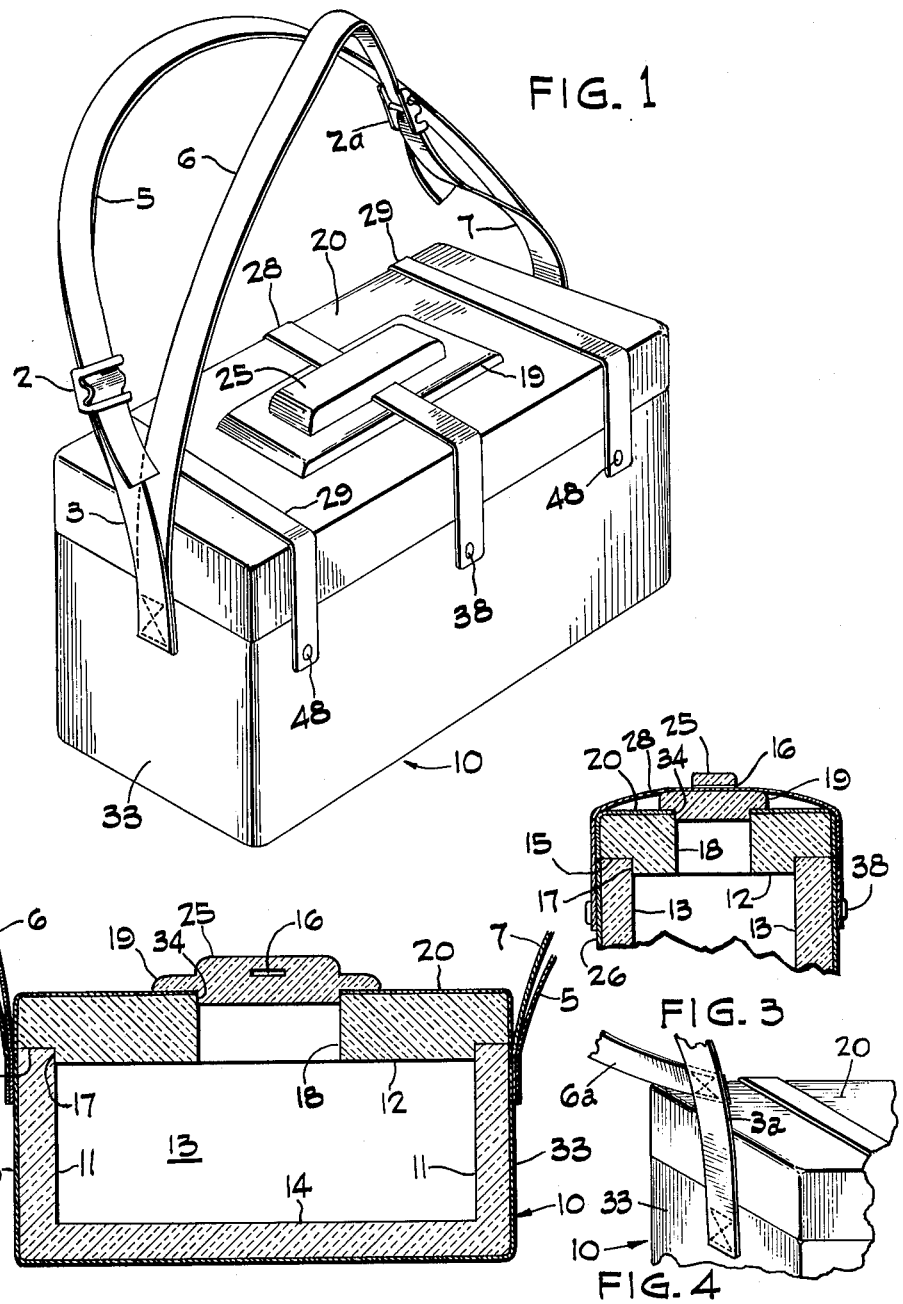
FIGURE 1 is a perspective view of a fishing creel constructed in accordance with the principles of the present invention.
FIGURE 2 is a longitudinal vertical sectional view taken through the creel shown in FIGURE 1 along the longitudinal center of the creel.
FIGURE 3 is a fragmentary transverse sectional view of the creel shown in FIGURE 1 taken through the transverse center of the creel.
FIGURE 4 is a fragmentary perspective view of the fishing creel, illustrating a modified form of shoulder and waist strap construction.

While the principles of the present invention are of general applicability as a portable cooler, a particularly useful utilization of the inventive principles is in the form of a fishing creel, illustrated generally at 10 in FIGURES 1 and 2.

The creel 10 includes a light but rugged body made from insulating material such as a foamed thermoplastic resin. One material which has been advantageously used in accordance with the principles of the present invention is expandable polystyrene. Expandable polystyrene is produced as free flowing beads containing an integral expanding agent. When exposed to heat, the beads expand to cover 60 times their original volume, for example, to as low as 1 lb. per cubic foot.

The foam-like material thus produced exhibits unique properties. Thus, there is a closed cell structure having controllable density in low thermal conductivity. Furthermore, the material has low water absorption, low water vapor permeability and displays the requisite degree of toughness and all around adaptability which makes it suitable as a cooler for fish and the like. Furthermore expandable polystyrene is dimensionally stable at ambient temperatures up to 175° F. and resists acids, alkalies and the lower alcohols.

The foam material does not embrittle at low temperatures and demonstrates no loss in impact resistance even at extremely low temperatures.

The water absorption of the foam material is extremely low because of the non-interconnecting cell structure. The water absorption in a typical example, after 48 hours of immersion under hydrostatic pressure equivalent to 10 feet of water, the water absorption is less than 0.9 percent by volume.

The foam material also exhibits a very low water vapor transmission rate in the order of about 1.0 to 1.7 grains per hour per square foot per inch of thickness per inch of hg. vapor difference (by A.S.T.M. method C 355–54 T.).

Foaming the expandable polystyrene beads ordinarily comprises two discrete steps, namely (1) heat pre-expanding the unconfined virgin beads, whereupon the translucent beads assume a spherical shape and become white in color and (2) further heat expansion of the pre-expanded beads within the shaping confines of the mold to produce a smooth-skin, close cell foam of controlled density, registering every detail of the mold.

In the cooler 10 of the present invention, the expandable polystyrene material is heat expanded within the shaping confines of a mold to produce a container having a detachable top cover 12, end walls shown at 11, side walls 13 and a bottom wall 14.

The end and side walls 11 and 13 are parallel and have plain top edges abutted by a shouldered recess 15 in the hinged top cover 12. The shouldered recess 15 has a vertical shoulder or wall 17 defining the inner margin thereof and extending downwardly along the end and side walls 11 and 13. The top cover 12 is likewise molded from expandable polystyrene and fits along the top edges and insides of the side and end walls of the container and has a central access opening 18 therein, which is preferably rectangular in form and is closed by a detachable closure member 19. The closure member 19 may be molded from a plastic material, which may be a transparent material and which may be a plastic material known to the trade as "Lucite." The detachable closure member 19 has a hand grip 25 extending along the central portion thereof. A slot 16 extends through said hand grip transversely thereof. A strap 28 extends through said slot in said hand grip. The strap may be a leather or canvas strap, but preferably is made from elastic material and may be riveted, sewed or otherwise secured to a back 26 of a fabric envelope or covering 20 for the creel. The strap 28 extends transversely across the top of the creel through the slot 16 and is detachably connected to the front wall of the fabric covering as by a snap fastener 38, or any other suitable fastening means. Straps 29, similar to the strap 28 extend parallel to the strap 28 and are also sewed or otherwise secured to a back wall 26 of the covering 20, and extend across the back of the top cover 12 and over the top thereof, and are detachably connected to the front wall of the fabric envelope or covering 20, as by snap fasteners 48.

The envelope or covering 20 may be made from a durable fabric, a suitable form of fabric being flax canvas, and is sewed to conform to the form of the container and the back wall 26 thereof extends above the top of the container 11 and along the back of the cover 12 and over the top of said cover. The portion of the covering or envelope 20 extending over the top of the top cover 12 may be sewed to fit said cover rather tightly and may be secured thereto by a suitable cement if desired. The portion of the envelope or covering 20 extending along the top of the cover 12 has a central opening 34 therein conforming to the opening 18. The surface of said covering about said opening is abutted by the closure member 19, closing the opening 18.

The back wall 26 of the envelope 20 extends vertically along the back wall of the container and cover 12 and forms a hinged connector, connecting said cover to the back wall of the container, to be opened about said back wall upon release of the snap fasteners 38 and 48. The covering 20 is, therefore, relatively loose in the region of the connection between the cover 20 and the container, to accommodate ready opening and closing of said top cover.

An end wall 33 of the covering 20 has straps 3 and 6 secured thereto, cooperating with corresponding straps 5 and 7, secured to the opposite end wall 33. The respective straps 3 and 7 have buckles 2 and 2a sewed or otherwise secured thereto, through which pass the respective straps 5 and 6, to accommodate the length of the straps to be adjusted to the body of the user.

The straps 3 and 5 when buckled together may be a shoulder strap, while the straps 6 and 7 may be buckled around the waist and form a waist strap, to retain the creel in position on the body.

In FIGURE 4, I have shown a modified form of strap structure in which a waist strap 6a is sewed to a shoulder strap 3a. The strap (not shown) to which the strap 6a is buckled may be sewed to a strap corresponding to the strap 7 (not shown) in a like manner.

In using the fishing creel, ice may be placed in the bottom of the creel of a sufficient depth to keep the fish to the required temperature and then may be closed. Fish may then be placed therein by removal of the closure member 19 without releasing the snap fasteners 38 and 48. The condition of the fish and the number of fish in the creel may then be readily observed through the closure member 19 held in place by the elastic strap 28.

Where it is not practical to insert fish in the creel through the opening 18, the cover 20 may be opened about the back wall 26 for the placing of fish therein. It should be understood that the joint between the cover 20 and the container is sufficiently tight that the straps 28 and 29 need not be refastened by snap fasteners 38 and 48 each time the creel is opened and closed, and that said snap fasteners need only be fastened when carrying the creel from place to place or where conditions are such that the creel may accidentally open.

It may further be seen that the creel of the present invention need not necessarily be used as a fishing creel but may be used as an efficient portable cooler adaptable to various uses.

Although minor modifications might be suggested by those versed in the art, it should be understood that I wish to embody within the scope of the patent warranted hereon, all such modifications as reasonably and properly come within the scope of my contribution to the art.

I claim as my invention:

1. A combined fishing creel and portable cooler comprising a box like container molded from a lightweight insulating material and having a bottom, parallel sides and end walls extending upwardly therefrom and terminating in coplanar upper edges, a top cover for said container having a downwardly opening recess extending thereabout and having a plane marginal surface engaging said coplanar upper edges of said side and end walls and having vertical surfaces depending from said plane marginal surface and extending along the inner sides of said side and end walls to form a substantial seal therefor, a fabric envelope for said container extending along said bottom side and end walls and upwardly along said top cover and over the top thereof and closely fitting said container and cover and forming a hinge for said cover, carrying straps secured to opposite sides of said envelope adjustable to accommodate the carrying of the container on the shoulder and fastening straps secured to the back wall of said envelope and extending over the top of said envelope and securing said cover in a closed position, and accommodating ready opening thereof.

2. A combined fishing creel and cooler in accordance with claim 1 in which the top cover has an access opening therein, and wherein a removable closure member is provided for said opening and affords access to said container without opening said cover.

3. A combined fishing creel and cooler in accordance with claim 2 in which the closure member has a slot extending therethrough and in which one of said straps extends through said slot and is elastic, to retain said closure member to said opening and to accommodate ready opening thereof.

4. A combined fishing creel and cooler in accordance with claim 1, wherein the carrying straps have a waist strap secured thereto and extending laterally therefrom closely adjacent the top of said container.

5. A combined fishing creel and cooler in accordance with claim 3, wherein the closure member is made from a transparent plastic material.

References Cited by the Examiner

UNITED STATES PATENTS

| | | | |
|---|---|---|---|
| 1,302,312 | 4/1919 | Cook | 224—5.8 |
| 1,446,709 | 2/1923 | Leyse | 220—82.5 |
| 1,869,071 | 7/1932 | McLean | 224—7 |
| 2,165,630 | 7/1939 | Gardella | 220—82.5 |
| 2,899,103 | 8/1959 | Ebert | 220—94 |
| 3,062,421 | 11/1962 | Fleming | 224—7 |

GERALD M. FORLENZA, *Primary Examiner.*

HUGO O. SCHULZ, *Examiner.*